United States Patent
Hirata et al.

(10) Patent No.: US 11,412,547 B2
(45) Date of Patent: Aug. 9, 2022

(54) COMMUNICATION DEVICE AND COMMUNICATION SYSTEM

(71) Applicant: Sony Corporation, Tokyo (JP)

(72) Inventors: Ryuichi Hirata, Kanagawa (JP); Yuichi Morioka, Kanagawa (JP); Yusuke Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 133 days.

(21) Appl. No.: 16/763,235

(22) PCT Filed: Oct. 4, 2018

(86) PCT No.: PCT/JP2018/037153
§ 371 (c)(1),
(2) Date: May 12, 2020

(87) PCT Pub. No.: WO2019/097881
PCT Pub. Date: May 23, 2019

(65) Prior Publication Data
US 2021/0176784 A1    Jun. 10, 2021

(30) Foreign Application Priority Data
Nov. 20, 2017  (JP) .............................. JP2017-222756

(51) Int. Cl.
*H04W 74/08* (2009.01)
*H04W 74/00* (2009.01)
(Continued)

(52) U.S. Cl.
CPC ....... *H04W 74/0816* (2013.01); *H04L 1/1896* (2013.01); *H04L 5/14* (2013.01); *H04W 74/008* (2013.01)

(58) Field of Classification Search
CPC .... H04L 1/1896; H04L 5/14; H04W 74/0816; H04W 74/008
See application file for complete search history.

(56) References Cited

U.S. PATENT DOCUMENTS

| | | | |
|---|---|---|---|
| 9,560,674 B2 * | 1/2017 | Djukic | ...................... H04L 5/14 |
| 2004/0075553 A1 * | 4/2004 | Ono | ...................... B60R 25/102 |
| | | | 340/539.13 |

(Continued)

FOREIGN PATENT DOCUMENTS

JP    2006-246142 A    9/2006

OTHER PUBLICATIONS

International Search Report and Written Opinion dated Dec. 25, 2018 for PCT/JP2018/037153 filed on Oct. 4, 2018, 7 pages including English Translation of the International Search Report.

(Continued)

*Primary Examiner* — Kevin C. Harper
*Assistant Examiner* — Henry Baron
(74) *Attorney, Agent, or Firm* — Xsensus LLP

(57) ABSTRACT

[Problem] A communication device that can more efficiently avoid the hidden node problem is provided.
[Solution] The communication device includes a communication unit configured to receive a data signal from another communication device, a determination unit configured to determine whether the data signal received by the communication unit includes a request for transmission of a busy signal indicating that a channel is in use, and a control unit configured to control a process of transmitting the busy signal by the communication unit, in accordance with a determination result of the determination unit.

4 Claims, 12 Drawing Sheets

(51) Int. Cl.
*H04L 1/18* (2006.01)
*H04L 5/14* (2006.01)

(56) References Cited

U.S. PATENT DOCUMENTS

| | | |
|---|---|---|
| 2009/0059891 A1 | 3/2009 | Sakoda et al. |
| 2017/0202019 A1 | 7/2017 | You et al. |
| 2017/0208627 A1 | 7/2017 | You et al. |

OTHER PUBLICATIONS

Matsushita, Y., et al., "Distributed Coordinated Media Series 7: Wireless LAN Architecture," First Edition, Jun. 5, 1996, pp. 62-65.

* cited by examiner

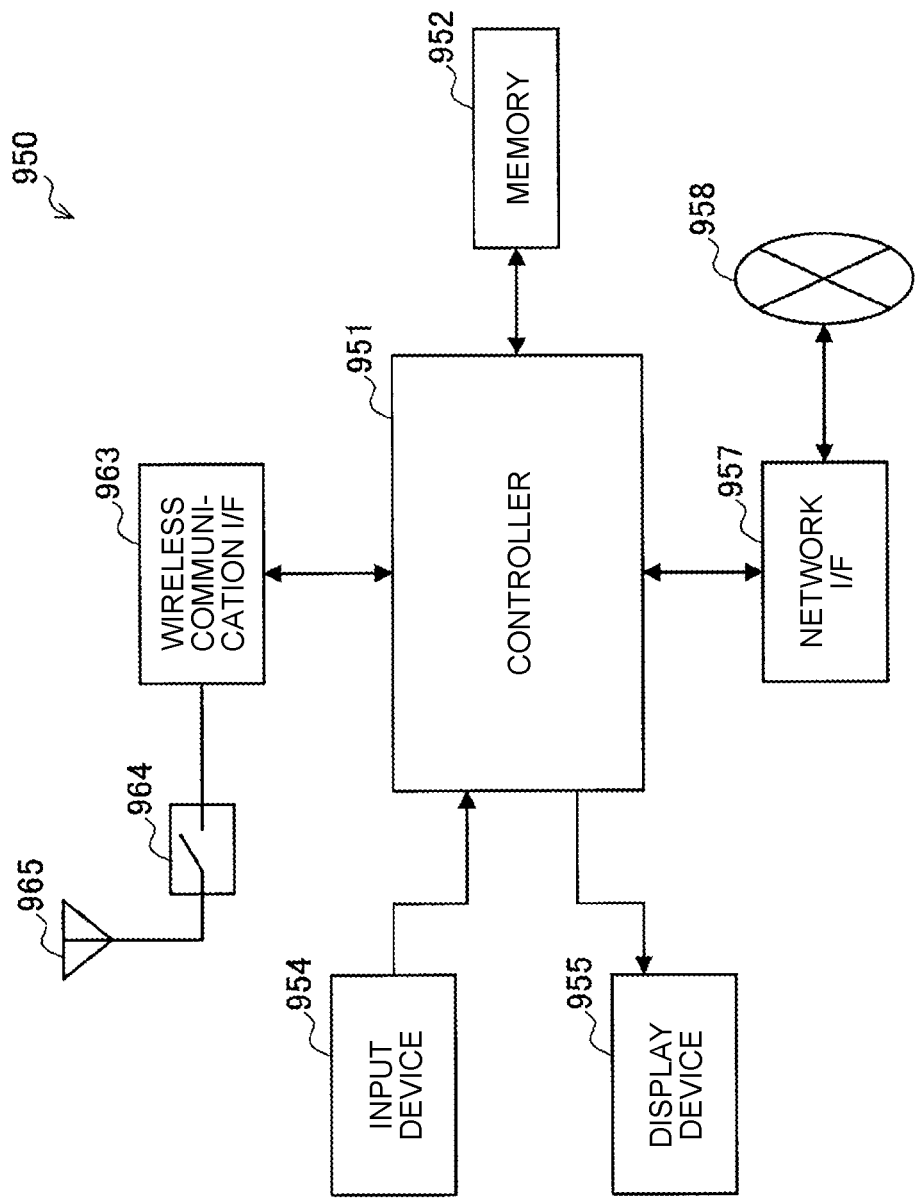

COMMUNICATION DEVICE AND COMMUNICATION SYSTEM

CROSS-REFERENCE TO RELATED APPLICATIONS

The present application is based on PCT filing PCT/JP2018/037153, filed Oct. 4, 2018, which claims priority to JP 2017-222756, filed Nov. 20, 2017, the entire contents of each are incorporated herein by reference.

FIELD

The present disclosure relates to a communication device and a communication system.

BACKGROUND

In a wireless communication system, when a plurality of communication terminals are present at locations where they cannot detect each other, the hidden node problem occurs, in which frames transmitted by the communication terminals collide. IEEE.802.11 standards for half-duplex communication solve the hidden node problem such that communication terminals exchange Request to Send (RTS)/Clear to Send (CTS) frames. Unfortunately, in the RTS/CTS frame exchange, the time taken for the communication terminals to exchange frames is overhead. Moreover, the RTS/CTS frame exchange fails to reduce the effect from a hidden terminal in another communication system that cannot know the content of the CTS frame. Techniques related to full-duplex communication that allow for simultaneous transmission and reception have been developed as techniques for more efficient wireless communication.

For example, Patent Literature 1 discloses a method of reducing the effect from a hidden terminal such that a full-duplex communication-adapted terminal transmits a busy signal. The busy signal has duration information calculated from information described in a data signal being received. A hidden terminal receiving the busy signal sets a transmission-prohibited period, based on the duration information.

CITATION LIST

Patent Literature

Patent Literature 1: U.S. Pat. No. 9,560,674

SUMMARY

Technical Problem

Unfortunately, the method in Patent Literature 1 is effective only for a terminal capable of decoding duration information and fails to sufficiently avoid the effect from a hidden terminal in another communication system incapable of decoding duration information. Moreover, the full-duplex terminal transmits a busy signal upon detection of a data signal, which may significantly reduce transmission opportunity for the hidden terminal.

The present disclosure is made in view of the above and provides a new and improved communication device and a communication system that can more efficiently avoid the hidden node problem.

Solution to Problem

According to the present disclosure, a communication device is provided that includes: a communication unit configured to receive a data signal from another communication device; a determination unit configured to determine whether the data signal received by the communication unit includes a request for transmission of a busy signal indicating that a channel is in use; and a control unit configured to control a process of transmitting the busy signal by the communication unit, in accordance with a determination result of the determination unit.

Moreover, according to the present disclosure, a communication system is provided that includes: a data receiving device configured to determine whether a data signal received from another communication device includes a request for transmission of a busy signal indicating that a channel is in use, and to transmit the busy signal in accordance with a determination result; and a data transmitting device configured to transmit the data signal to the other terminal, depending on whether the other terminal receiving the data signal transmitted to another communication device is transmitting the busy signal.

Advantageous Effects of Invention

As explained above, the present disclosure can more efficiently avoid the hidden node problem.

The effect above is not intended to be limitative, and any effects illustrated in the present description or other effects that may be construed from the present description may be achieved in addition to or instead of the effect above.

BRIEF DESCRIPTION OF DRAWINGS

FIG. 12 is a block diagram illustrating an example of the overall configuration of a wireless access point.

DESCRIPTION OF EMBODIMENTS

Preferred embodiments of the present disclosure will be described in detail below with reference to the accompanying drawings. In the present description and drawings, the components having substantially the same functional configuration are denoted by the same reference signs and an overlapping description is omitted.

The description will be given in the following order.
1. Overview of Communication System
2. Embodiment of the Present Disclosure
2-1. Function Overview
2-2. Functional Configuration Example
2-3. Communicated Information
2-4. Operation Example
3. Application Examples
4. Closing

1. Overview of Communication System

1-1. Configuration of Communication System

Figure 1:
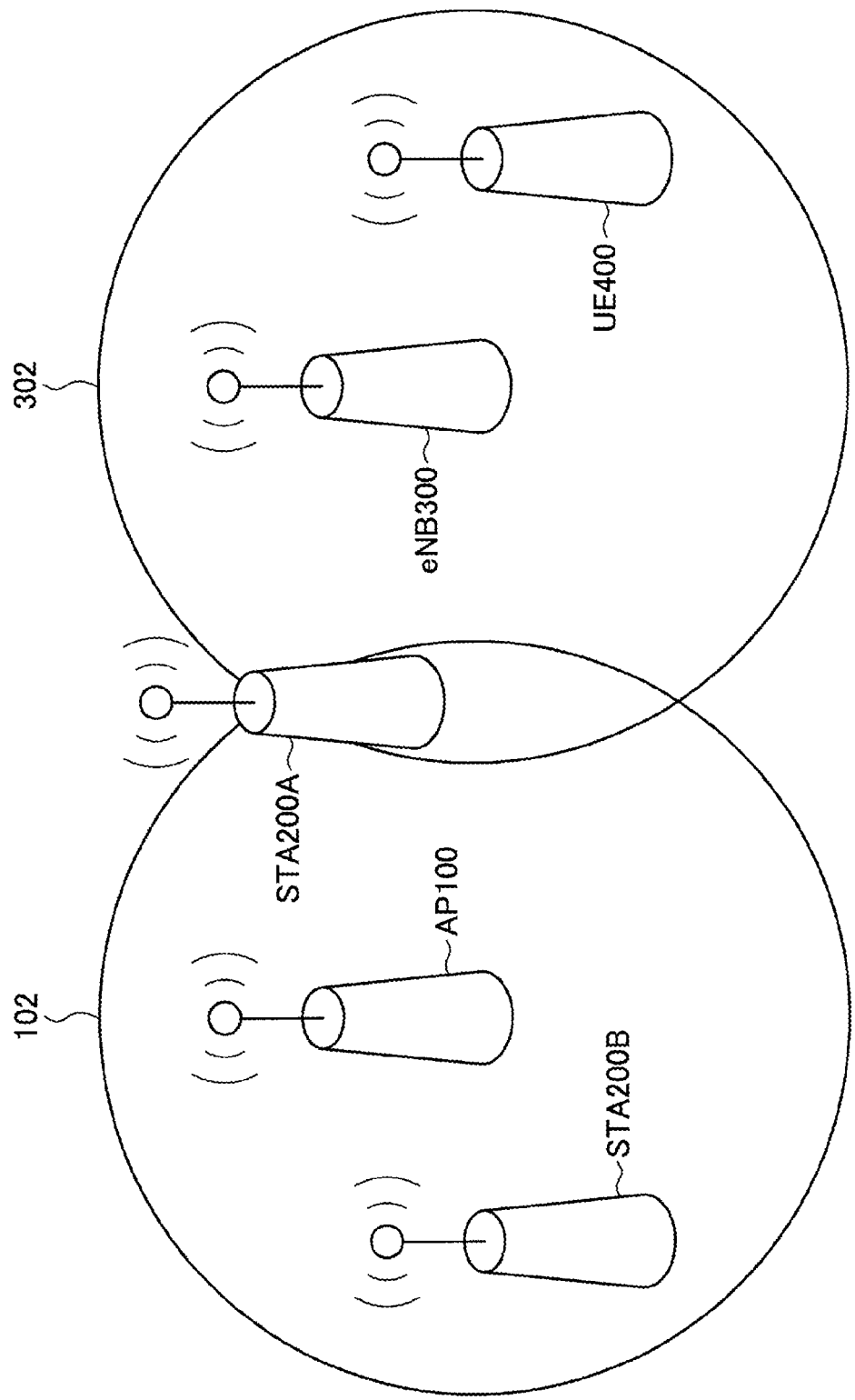
FIG. 1 is a diagram illustrating a configuration of a communication system according to an embodiment of the present disclosure.

Referring first to FIG. 1, a configuration of a communication system according to an embodiment of the present disclosure will be described. As illustrated in FIG. 1, the communication system according to the present disclosure is a wireless LAN system (for example, a wireless LAN system compliant with IEEE 802.11). The wireless LAN system is configured with, for example, an access point (AP) 100 that is a base station for communication devices and a station (STA) 200 that is a slave unit. In the vicinity of the communication system, another system also exists, which is configured with an evolved Node B (eNB) 300 that is a base station for communication devices and a user equipment (UE) 400 that is a slave unit. In FIG. 1, a STA 200A and a STA 200B exist as slave units of the AP 100.

The AP 100 is a communication device that functions as a base station in the wireless LAN system. For example, the AP 100 is connected to an external network to provide the STA 200 with communication with the external network. For example, the AP 100 is connected to the Internet to provide communication between the STA 200 and a device on the Internet or a device connected through the Internet. The communication scheme, the kind, the shape, etc. of the AP 100 are not limited. The range in which the AP 100 can detect other communication devices is a detection area 102.

The STA 200 is a communication device that functions as a slave unit in the wireless LAN system and communicates with the AP 100. For example, the STA 200 may be any device such as a display having a display function, a memory having a storage function, a keyboard and a mouse having an input function, a speaker having a sound output function, and a smartphone having the function of performing advanced computational processing. The communication scheme, the kind, the shape, etc. of the STA 200 are not limited.

The eNB 300 is a communication device that functions as a base station in another system, and the UE 400 is a communication device that functions as a slave unit in another system. The communication scheme, the kind, the shape, etc. of the eNB 300 and the UE 400 are not limited. For example, another system is Licensed-Assisted Access (LAA) that is a wireless communication system using the unlicensed frequency band formulated by the 3rd Generation Partnership Project (3GPP), and the eNB 300 and the UE 400 may communicate using an LAA-compliant communication scheme. The range in which the eNB 300 can detect other communication devices is 302.

Each communication device basically can detect communication performed in another system only by electric power. More specifically, the AP 100 and the STA 200 included in the wireless LAN system can detect communication performed by the eNB 300 and the UE 400 included in another system only by electric power. This is applicable to the eNB 300 and the UE 400 included in another system.

1-2. Hidden Node Problem

Figure 2:
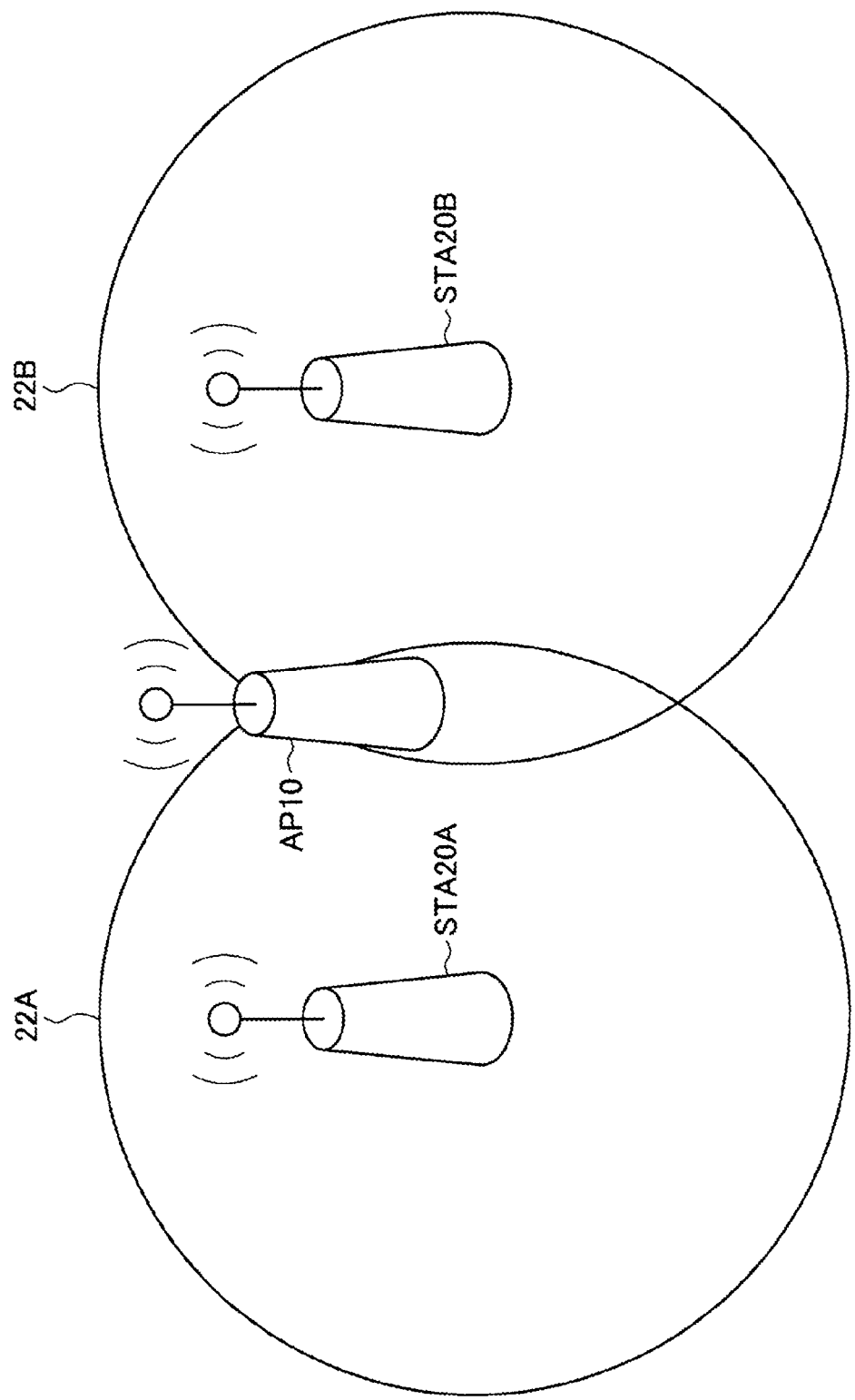
FIG. 2 is a diagram illustrating a configuration of a communication system in a comparative example.

As illustrated in FIG. 2, it is assumed that there exists a communication system configured with an AP 100, an STA 20A with a detection area 22A, and an STA 20B with a detection area 22B. In FIG. 2, since the STA 20A and the STA 20B are unable to detect each other, the hidden node problem occurs in which the frames transmitted by the STA 20A and the STA 20B to the AP 10 collide.

Figure 3:
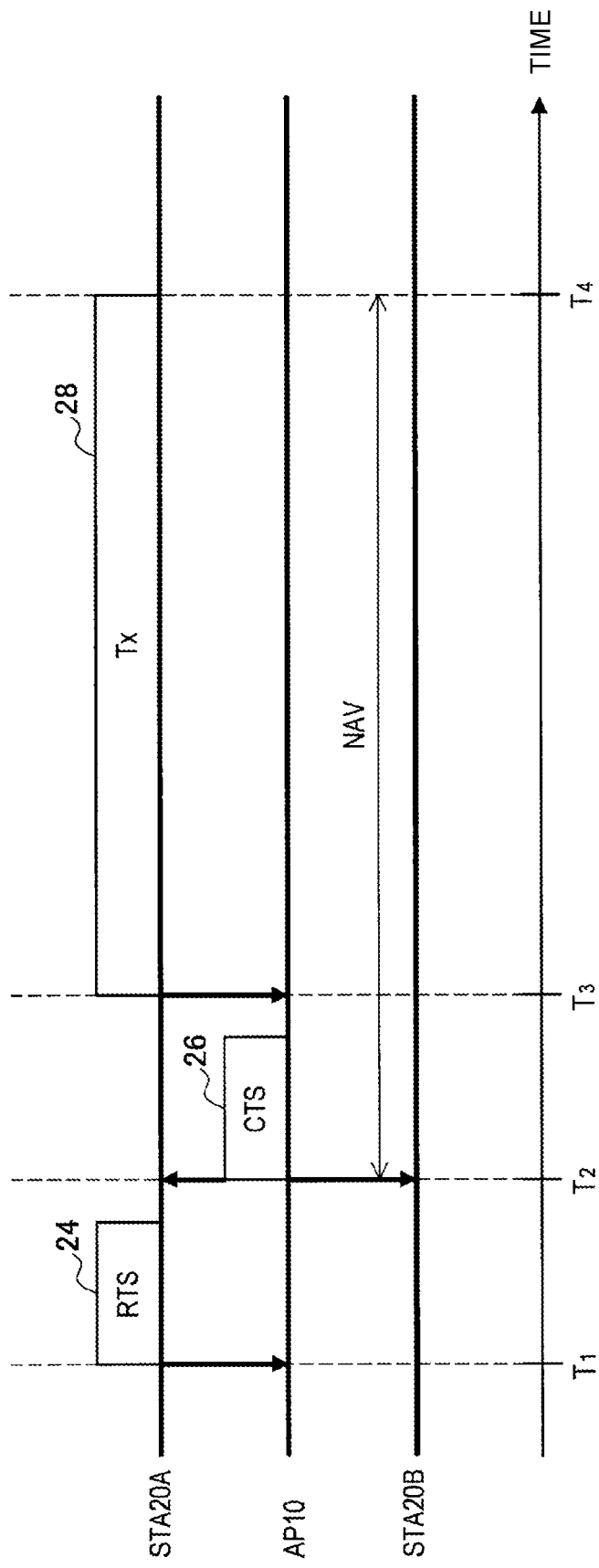
FIG. 3 is a sequence diagram illustrating an operation example of a communication system in a comparative example.

As illustrated in FIG. 3, the communication terminals perform RTS/CTS frame exchange between the communication terminals to cope with the hidden node problem. Specifically, the STA 20A transmits an RTS frame 24 to the AP 10 before transmitting data to the AP 10 (time $T_1$). The AP 10 receiving the RTS frame 24 transmits a CTS frame 26 to other communication terminals (time $T_2$) as a response. The STA 20A receiving the CST frame transmits data to the AP 10 as $T_x 28$ (time $T_3$-$T_4$). At time $T_2$, the STA 20B also receives the CTS frame 26, and the STA 20B finds that another communication device occupies a channel from information described in the CTS frame 26 and sets a network allocation vector (NAV). NAV is a transmission-prohibited period, and the communication device in which NAV is set defers communication for the duration of NAV.

The hidden node problem may occur not only between communication terminals in the same system but also between communication terminals in different systems. Specifically, a case where the hidden node problem occurs in the embodiment of the present disclosure will be described. For example, in FIG. 1, it is assumed that the STA 200A in the wireless LAN system and the eNB 300 in another system have a hidden terminal relation. That is, the STA 200A cannot detect a signal transmitted from the eNB 300 and the eNB 300 cannot detect a signal transmitted from the STA 200. A case where the STA 200A transmits a signal to the AP 100 in this situation will be discussed.

Supposing that the eNB 300 can recognize a CTS frame, when the STA 200A transmits an RTS frame to the AP 100 before communication of a signal by the STA 200A, and the AP 100 receiving it transmits a CTS frame, the eNB 300 receives the CTS frame and thereby can wait for transmitting a signal as appropriate during transmission of a signal by the STA 200A.

However, the eNB 300 cannot recognize the CTS (and RTS) frame and can only detect electric power as for communication of the wireless LAN system. Accordingly, there is a possibility that the eNB 300 transmits a signal during transmission of a signal by the STA 200A to cause interference of the signals, whereby the AP 100 fails to receive a signal from the STA 200A.

2. Embodiment of the Present Disclosure

2-1. Function Overview

In an embodiment of the present disclosure, when a communication device receives data from another communication device, the communication device determines whether the data signal is addressed to the communication device itself and includes a request for transmission of a busy signal, and controls the process of transmitting a busy signal based on the determination result. Here, the busy signal refers to a signal that notifies another communication device that the channel is in use. Specifically, when the AP 100 transmits data addressed to the STA 200A, the STA 200A and the STA 200B detect a data signal. At that moment, the eNB 300 in another system is unable to detect the data signal.

When starting connection of communication, the AP 100, the STA 200A, and the STA 200B can describe that the operation related to transmission of a busy signal can be carried out in capability field and transmit capability field to each other. Each communication device receiving capability field can know that the transmitter of capability field can carry out the operation related to a busy signal.

The STA 200A and the STA 200B determine whether the received data signal is directed to them. When the data signal is directed to them, the STA 200A and the STA 200B confirm whether a request for transmission of a busy signal is included in the data signal. When a request for transmission of a busy signal is included in the data signal, the STA 200A and the STA 200B transmit a busy signal and start receiving the data signal. At that moment, the eNB 300 in another system can detect the power of the busy signal transmitted by one of the STA 200A and the STA 200B.

The function overview of the communication device according to the embodiment of the present disclosure has been described above. A functional configuration example of the communication device according to the embodiment of the present disclosure will now be described.

2-2. Functional Configuration Example

Figure 4:
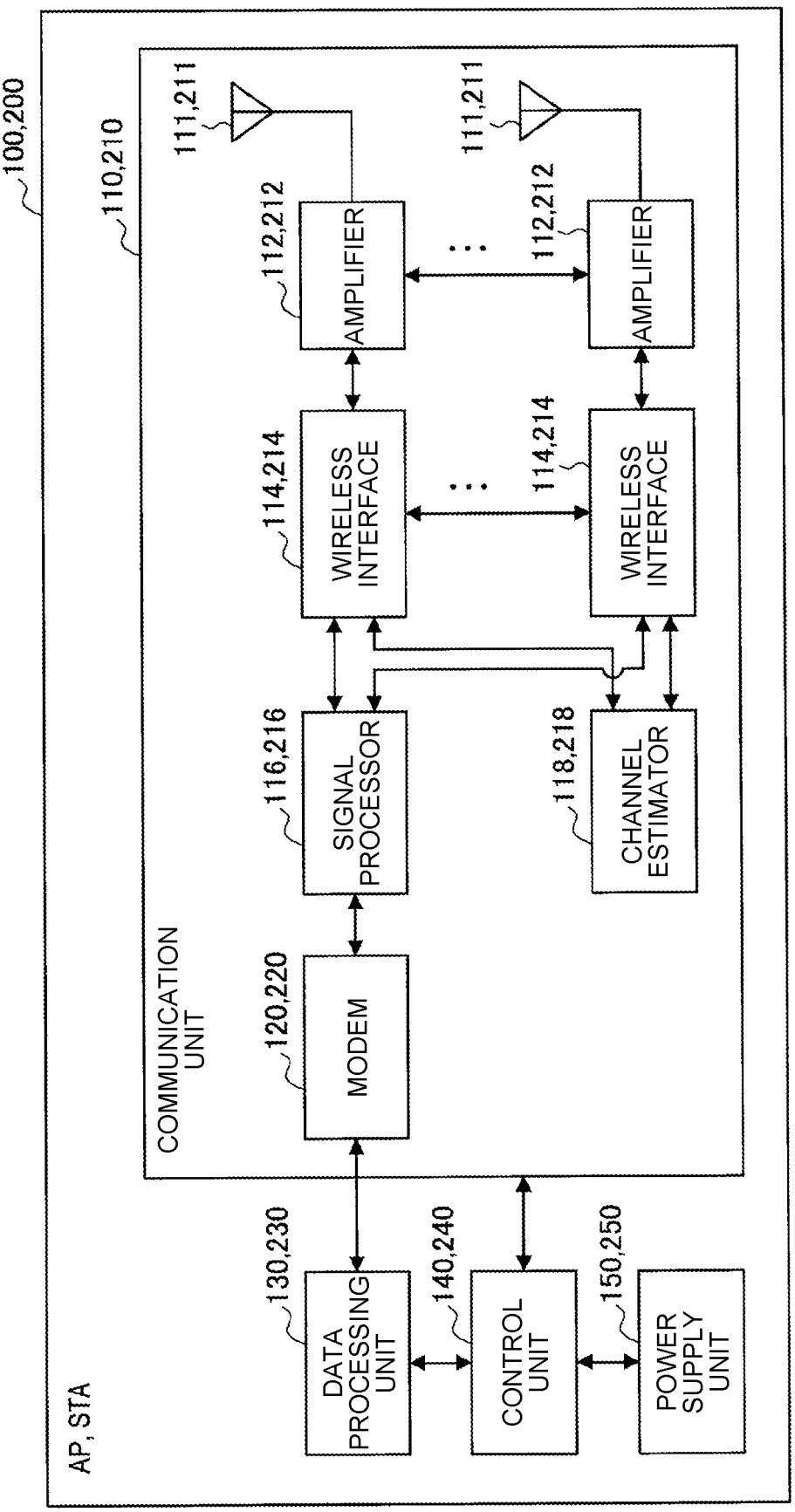
FIG. 4 is a block diagram illustrating a functional configuration example of a communication device according to the embodiment.

Referring to FIG. 4, a functional configuration example of a communication device according to the present embodiment will be described below. FIG. 4 is a block diagram illustrating a functional configuration example of a communication device. A communication device adapted to full-duplex communication is used as the communication device according to an embodiment of the present disclosure. Full-duplex communication is a communication scheme in which data transmission and reception can be simultaneously performed from both sides. For example, a communication device adapted to full-duplex communication can receive data from another communication device while transmitting a busy signal to another communication device.

Hereinafter, the communication device refers to both or one of the AP 100 and the STA 200. As the AP 100 and the STA 200 may have a similar functional configuration, the functional configuration of the AP 100 will be described below, and a description of the functional configuration of the STA 200 is omitted. However, this is only by way of example, and the AP 100 and the STA 200 may have different functional configurations. For example, the AP 100 may separately have the function of controlling a plurality of STAs 200.

As illustrated in FIG. 4, the AP 100 includes a communication unit 110, a data processing unit 130, a control unit 140, and a power supply unit 150.

(1) Communication Unit 110

The communication unit 110 functions as a transmission unit and a reception unit and has the function of transmitting/receiving an RTS frame, a CTS frame, and a data frame to/from another communication device. The communication unit 110 according to an embodiment of the present disclosure includes an antenna 111, an amplifier 112, a wireless interface 114, a signal processor 116, a channel estimator 118, and a modem 120. When the amplifier 112 and the wireless interface 114 make a set, two or more sets may be provided (the drawing illustrates an example in which two or more sets are provided). The function of the amplifier 112 may be incorporated into the wireless interface 114.

(Antenna 111)

The antenna 111 has a single or a plurality of antenna elements and has the function of outputting a reception signal from another communication device to the amplifier 112 and the function of transmitting a transmission signal input from the amplifier 112 to another communication device.

(Amplifier 112)

The amplifier 112 performs amplification of a signal. To be more specific, at the time of reception, the amplifier 112 amplifies a reception signal input from the antenna 111 to a predetermined power and outputs the amplified signal to the wireless interface 114 described later. At the time of transmission, the amplifier 112 amplifies a transmission signal input from the wireless interface 114 to a predetermined power and outputs the amplified signal to the antenna 111. These functions may be implemented by the wireless interface 114.

(Wireless Interface 114)

At the time of reception, the wireless interface 114 down-converts a reception signal that is an analog signal provided from the amplifier 112 to acquire a baseband signal and performs a variety of processing such as filtering and conversion to a digital signal for the baseband signal to generate and output a reception symbol stream to the signal processor 116 described later. At the time of transmission, the wireless interface 114 converts an input from the signal processor 116 to an analog signal and performs filtering and up-conversion to a carrier frequency band to send the signal to the amplifier 112.

(Signal Processor 116)

At the time of reception, the signal processor 116 performs spatial processing for a reception symbol stream provided from the wireless interface 114 to acquire a data symbol stream independent for each reception symbol stream and provides the data symbol stream to the modem 120 described later. At the time of transmission, the signal processor 116 performs spatial processing for a data symbol stream input from the modem 120 and provides one or more acquired transmission symbol streams to each wireless interface 114.

(Channel Estimator 118)

The channel estimator 118 calculates complex channel gain information of a propagation path from a preamble portion and a training signal portion of the reception signal provided from each wireless interface 114. The calculated complex channel gain information is used in demodulation in the modem 120 and spatial processing in the signal processor 116.

(Modem 120)

At the time of reception, the modem 120 performs demodulation, deinterleaving, and decoding for a data symbol stream provided from the signal processor 116 to acquire reception data and provides the reception data to the data processing unit 130. At the time of transmission, the modem 120 performs encoding, interleaving, and modulation for a frame provided from the data processing unit 130, based on the coding and modulation scheme set by the control unit 140 described later, to generate a data symbol stream and provides the stream to the signal processor 116.

(2) Data Processing Unit 130

The data processing unit 130 has the function of performing processing such as analysis of a media access control (MAC) header for MAC and error detection in a frame, for reception data provided from the modem 120, at the time of reception. At the time of transmission, the data processing unit 130 generates a packet (data) for transmission and performs processing for the packet, such as attaching a MAC header and attaching an error detection code to generate a frame for transmission and provides the frame to the modem 120. The data processing unit 130 provides the control unit 140 with information in the reception data that is necessary for the determination process and the transmission control process in the control unit 140.

(3) Control Unit 140

The control unit 140 has the function of performing control of the configuration described above and performs processing such as exchange of information between the components described above, setting of parameters, and scheduling of processes. For example, the control unit 140 performs parameter setting in the modem 120 and the signal processor 116 and scheduling of packets in the data processing unit 130. For example, the control unit 140 performs parameter setting and transmission power control in the wireless interface 114 and the amplifier 112.

In an embodiment of the present disclosure, the control unit 140 has the function of controlling, for example, a determination process for performing control on transmission/reception of a data signal and a busy signal and a signal transmission/reception process based on the determination result of the determination process.

Figure 5:
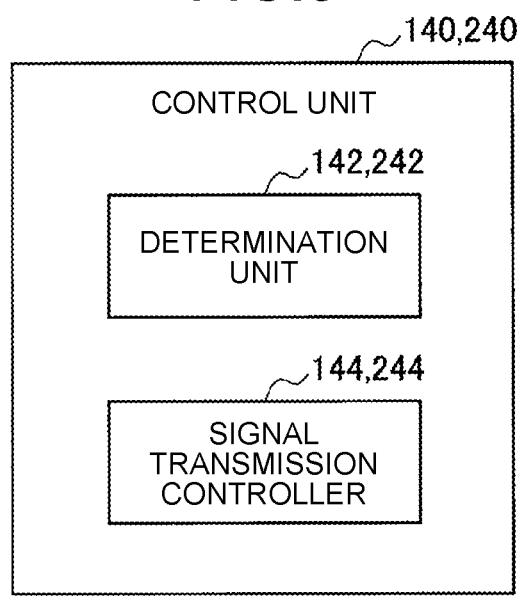
FIG. 5 is a block diagram illustrating a functional configuration example of a control unit according to the embodiment.

In order to implement the functions described above, the control unit 140 according to an embodiment of the present disclosure includes a determination unit 142 and a signal transmission controller 144 as illustrated in FIG. 5.

(Determination Unit 142)

The determination unit 142 has the function of performing a determination process for performing control on, for example, transmission and reception of a data signal and a busy signal. The process in the determination unit 142 differs depending on whether the communication device is a receiver side that receives a data signal or a transmitter side. The process in each of the receiver side and the transmitter side will be described below. In the following description, the communication device on the receiver side that receives a data signal is the STA 200A, and the communication device on the transmitter side that transmits a data signal is the AP 100.

In a Case where the Communication Device is the Receiver Side that Receives a Data Signal The determination unit 242 of the STA 200A determines whether the STA 200A is to receive a data signal when the data signal is detected. For example, the determination unit 242 confirms whether the data signal is addressed to the STA 200A itself, based on information included in the data signal. When the data signal is addressed to the STA 200A itself, the determination unit 242 determines that the STA 200A is to receive the data signal and provides the determination result to the signal transmission controller 244. When the data signal is not addressed to the STA 200A itself, the determination unit 242 determines that the STA 200A is not to receive the data signal and provides the determination result to the signal transmission controller 244. The determination unit 242 may perform the address determination by performing RTS/CTS frame exchange before a data signal is detected.

The determination unit 242 performs a determination process as to whether the STA 200 is located at a position where signal transmission by the STA 200A may affect signal transmission by the AP 100. For example, the determination unit 242 confirms whether a busy signal is detected until a predetermined period of time (first period of time) elapses since the STA 200A detects a data signal.

Here, a predetermined period of time (first period of time) is, for example, a short inter frame space (SIFS) time. The (SIFS) time refers to the shortest wait time in a frame transmission interval. A predetermined period of time (first period of time) is not limited to SIFS time, and any given time may be set.

When a busy signal is not detected, the determination unit 242 determines that the STA 200A is located at a position where signal transmission by the STA 200A is less likely to affect signal transmission by the AP 100 and provides the determination result to the signal transmission controller 244. When a busy signal is detected, the determination unit 242 further determines whether the reception power of the busy signal is equal to or lower than a predetermined threshold. Here, a predetermined threshold is, for example, OBSS PD defined by IEEE 802.11ax. When the reception power is equal to or lower than OBSS PD, the determination unit 242 determines that the STA 200A is located at a position where signal transmission by the STA 200A is less likely to affect signal transmission by the AP 100 and provides the determination result to the signal transmission controller 244. When the reception power is not equal to or lower than OBSS PD, the determination unit 242 determines that the STA 200A is located at a position where signal transmission by the STA 200A is more likely to affect signal transmission by the AP 100 and provides the determination result to the signal transmission controller 244.

When the STA 200A receives a data signal, the determination unit 242 performs a determination process as to whether the STA 200A is to transmit a busy signal. For example, when the STA 200A detects a data signal, the determination unit 242 confirms whether the data signal includes a request for transmission of a busy signal. When the data signal includes a request for transmission of a busy signal, the determination unit 242 determines that the STA 200A is to transmit a busy signal and provides the determination result to the signal transmission controller 244. When the data signal does not include a request for transmission of a busy signal, the determination unit 242 determines that the STA 200A is not to transmit a busy signal and provides the determination result to the signal transmission controller 244.

The determination unit 242 also performs a determination process for the operation after the STA 200A starts receiving the data signal. For example, the determination unit 242 confirms whether the STA 200A has completed reception of the data signal normally. When the STA 200A has completed reception of the data signal normally, the determination unit 242 determines that the STA 200A is to transmit ACK to the AP 100 and provides the determination result to the signal transmission controller 244. Here, ACK (Acknowledge) is a response to notify the transmitter side that reception of data has been completed normally. When the STA 200A fails to complete reception of the data signal normally, the determination unit 242 determines that the STA 200A is to stop transmitting the busy signal and provides the determination result to the signal transmission controller 244.

In a Case where the Communication Device is the Transmitter Side that Transmits a Data Signal The determination unit 142 of the AP 100 performs a determination process as to whether a data signal to be transmitted requires protection by a busy signal. For example, when the data signal satisfies at least one of a plurality of predetermined conditions, the determination unit 142 determines that the data signal does not require protection by a busy signal and provides the determination result to the signal transmission controller 144. When the data signal satisfies none of a plurality of predetermined conditions, the determination unit 142 determines that the data signal requires protection by a busy signal and provides the determination result to the signal transmission controller 144.

A plurality of predetermined conditions for determining whether the data signal requires protection by a busy signal will now be described. A plurality of predetermined conditions include Conditions 1 to 8.

Condition 1 is that the bit rate of the data signal is equal to or smaller than a first threshold. For example, the first threshold is the bit rate when the modulation method is 16QAM and the coding rate is ¾ in modulation and coding scheme (MCS). Condition 2 is that the frame length of the data signal is equal to or smaller than a second threshold. The second threshold is, for example, 1 ms. Condition 3 is that the priority of access category of the data signal is equal to or smaller than a third threshold. The third threshold is, for example, the priority when the access category is AC_BE.

Condition 4 is that the data signal is not a fine time measurement (FTM) frame. Condition 5 is that the data signal is not null data packet (NDP). Condition 6 is that the data signal is not a management frame. Condition 7 is that the data signal is not an RTS/CTS frame. Condition 8 is that the data signal is not spatial reuse PPDU (SR PPDU).

For example, when the STA 200A is less likely to fail to receive a data signal, the determination unit 142 may determine that the data signal does not require protection by a busy signal and may provide the determination result to the signal transmission controller 144. For example, when the AP 100 transmits a data signal with a low priority, the determination unit 142 may determine that the data signal does not require protection by a busy signal and may provide the determination result to the signal transmission controller 144.

The determination unit 142 performs a determination process as to whether the STA 200A is receiving a data signal normally. For example, when the data signal is data that requires protection by a busy signal, the determination unit 142 confirms whether the STA 200A is transmitting a busy signal. For example, if the AP 100 detects a busy signal until a predetermined period of time (second period of time) elapses since the AP 100 transmits a data signal, and even after a predetermined period of time (third period of time) elapses, the determination unit 142 determines that the STA 200A is receiving the data signal normally and provides the determination result to the signal transmission controller 144. Here, a predetermined period of time (the second period of time and the third period of time) is, for example, a SIFS time. A predetermined period of time (the second period of time and the third period of time) is not limited to the SIFS time, and any given time may be set. If the AP 100 does not detect a busy signal until the SIFS time elapses and even after the SIFS time elapses, the determination unit 142 determines that the STA 200A is not receiving the data signal normally and provides the determination result to the signal transmission controller 144.

The determination unit 142 performs a determination process as to whether the STA 200A has completed reception of the data signal normally. For example, the determination unit 142 confirms whether ACK is received from the STA 200A after the AP 100A completes transmission of a data signal and starts transmitting a busy signal. If the AP 100 receives ACK until the SIFS time elapses, the determination unit 142 determines that the STA 200A has completed reception of the data signal normally and provides the determination result to the signal transmission controller 144. If the AP 100 does not receive ACK until the SIFS time elapses, the determination unit 142 determines that the STA 200A fails to complete reception of the data signal normally and provides the determination result to the signal transmission controller 144.

(Signal Transmission Controller 144)

The signal transmission controller 144 has the function of controlling communication of data. Specifically, the signal transmission controller 144 controls a process related to, for example, transmission/reception of a data signal and a busy signal, based on the determination result acquired from the determination unit 142. The process in the signal transmission controller 144 differs depending on whether the communication device is the receiver side that receives a data signal or the transmitter side. The process in each of the receiver side and the transmitter side will be described below. In the following description, the communication device on the receiver side that receives a data signal is the STA 200A, and the communication device on the transmitter side that transmits a data signal is the AP 100.

In a Case where the Communication Device is the Receiver Side that Receives a Data Signal When the determination result that the STA 200A is to receive a data signal is acquired from the determination unit 242, the signal transmission controller 244 of the STA 200A makes the STA 200A ready to receive a data signal. When the determination result that the STA 200A is not to receive a data signal is acquired from the determination unit 242, the signal transmission controller 244 does not allow the STA 200A to receive a data signal and sets a busy state.

The signal transmission controller 244 has acquired the determination result that the STA 200A is located at a position where signal transmission by the STA 200A is less likely to affect signal transmission by the AP 100. In this case, the signal transmission controller 244 makes the STA 200A ready to transmit a signal (hereinafter called an idle state). The signal transmission controller 244 has acquired the determination result that the STA 200A is located at a position where signal transmission by the STA 200A is more likely to affect signal transmission by the AP 100. In this case, the signal transmission controller 244 keeps the STA 200A in a busy state.

When the determination result that the STA 200A is to transmit a busy signal is acquired from the determination unit 242, the signal transmission controller 244 allows the STA 200A to transmit a busy signal and also to receive a data signal. When the determination result that the STA 200A is not to transmit a busy signal is acquired from the determination unit 242, the signal transmission controller 244 does not allow the STA 200 to receive a data signal without transmitting a busy signal.

When the determination result that the STA 200A is to transmit ACK to the AP 100 is acquired from the determination unit 242, the signal transmission controller 244 allows the STA 200A to transmit ACK. When the determination result that the STA 200A is to stop transmitting a busy signal is acquired from the determination unit 242, the signal transmission controller 244 allows the STA 200A to stop transmitting a busy signal.

For example, when the STA 200A enters an idle state described above, the STA 200A becomes able to transmit data. However, it is desirable to avoid affecting signal transmission by the AP 100 when the STA 200A actually transmits a signal. For example, it is desirable to avoid affecting the process of receiving ACK by the AP 100.

Limitations then may be set in the process performed when the communication device is in an idle state. For example, limitations on an idle state may be set based on the transmission duration of a data signal, transmission power information of a busy signal, and transmission duration information of a busy signal that are described in a data signal received from the AP 100.

Specifically, the time at which the AP 100 is assumed to receive ACK may be calculated based on the above-noted information, and the time during which the STA 200A can keep an idle state may be limited in accordance with the calculated time, and, for example, the length of a signal that can be transmitted in an idle state may be set. The setting for an idle state may be made such that, for example, data transmission is not performed at the timing when ACK is received. The transmission power of a signal transmitted in an idle state may be set based on transmission power information of a busy signal and the reception power of a busy signal.

In a Case where the Communication Device is the Transmitter Side that Transmits a Data Signal When the determination result that the data signal does not require protection by a busy signal is acquired from the determination unit 142, the signal transmission controller 144 of the AP 100 allows the AP 100 to transmit the data signal without describing a request for transmission of a busy signal. When the determination result that the data signal requires protection by a busy signal is acquired from the determination unit 142, the signal transmission controller 144 allows the AP 100 to transmit the data signal in which a request for transmission of a busy signal is described.

When the determination result that the STA 200A is receiving the data signal normally is acquired from the determination unit 142, the signal transmission controller 144 allows the AP 100 to continue transmitting the data signal. When the determination result that the STA 200A is not receiving the data signal normally is acquired from the determination unit 142, the signal transmission controller 144 allows the AP 100 to stop transmitting the data signal.

When the determination result that the STA 200A has completed reception of the data signal normally is acquired from the determination unit 142, the signal transmission controller 144 allows the AP 100 to stop transmitting a busy signal. When the determination result that the STA 200A fails to complete reception of the data signal normally is acquired from the determination unit 142, the signal transmission controller 144 allows the AP 100 to stop transmitting a busy signal.

(5) Power Supply Unit 150

The power supply unit 150 is configured with a battery power supply or a fixed power supply and has the function of supplying electric power to the communication device.

2-3. Communicated Information

An example of information communicated by the AP 100 and the STA 200 will now be described.

In an embodiment of the present disclosure, information communicated between communication devices includes a data frame, a busy signal, and ACK. The information will be specifically described below.

2-3-1. Data Frame

Figure 6:
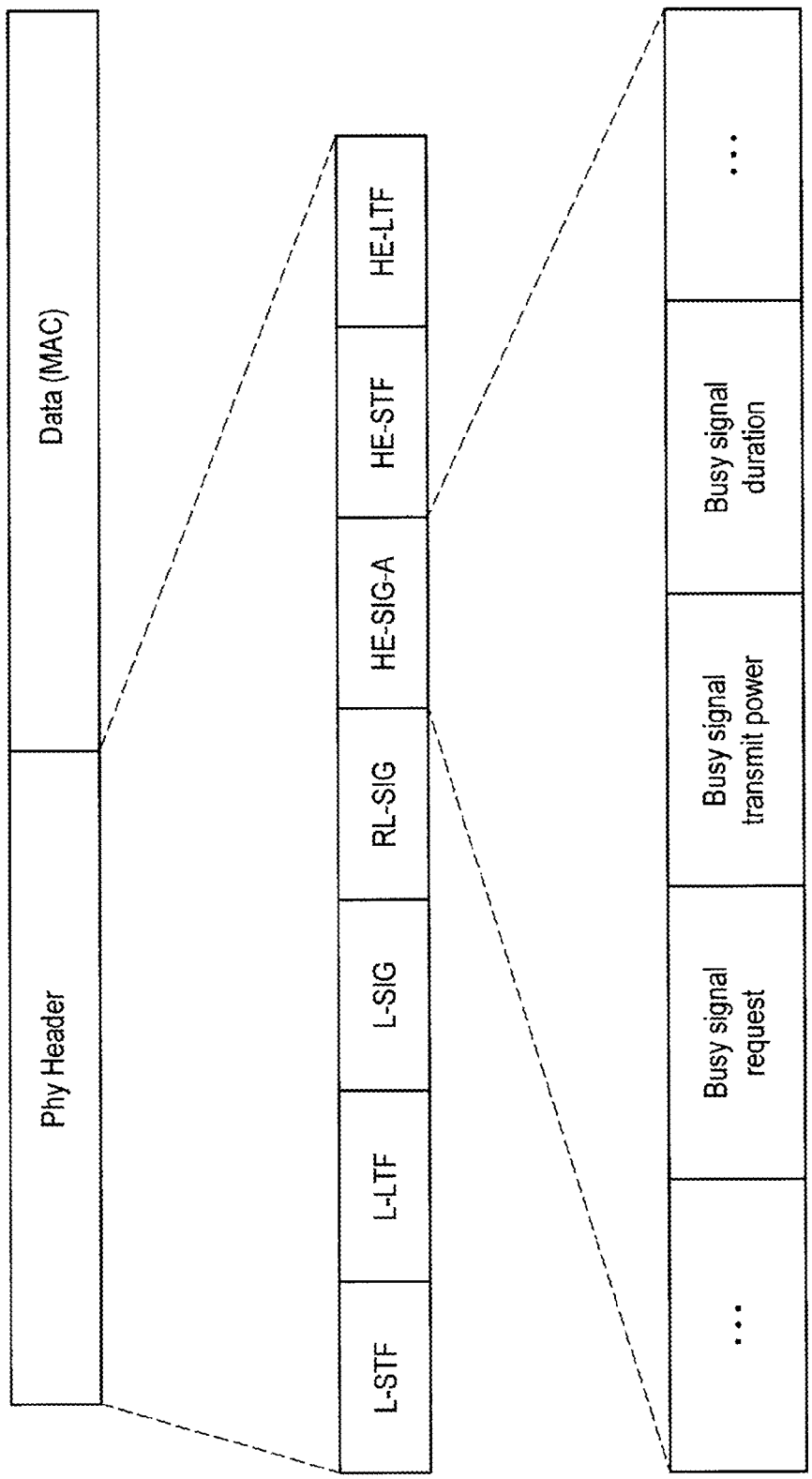
FIG. 6 is a diagram illustrating an example of the format of a data frame according to the embodiment.

Referring to FIG. 6, an example of the format of a data frame is described. In an embodiment of the present disclosure, for example, the data frame includes "PHY Header" and "Data (MAC)". The format of the frame is illustrated only by way of example. In the following, the format of the data frame will be described.

(1) PHY Header

PHY Header has information defined in accordance with wireless LAN standards. In an embodiment of the present disclosure, for example, PHY Header has fields such as "L-STF", "L-LTF", "L-SIG", "RL-SIG", "HE-SIG-A", "HE-STF", and "HE-LTF". This format of PHY Header is illustrated only by way of example. The fields that constitute PHY Header will be described below.

Legacy short training field (L-STF) is a field for performing a synchronization process for signal reception and mainly used for detecting a wireless packet signal and detecting the timing. Legacy long training field (L-LTF) is a field for performing a synchronization process for signal reception and mainly used for, for example, correcting an error of a carrier frequency and detecting a reference amplitude. Legacy signal field (L-SIG) is a field in which information such as the length of data included in a data portion of the frame, the transmission speed of the data portion, and the modulation scheme are recorded. Repeated legacy signal field (RL-SIG) repeatedly checks information recorded in L-SIG.

HE Signal A Field (HE-SIG-A) has information about transmission of a busy signal. For example, HE-SIG-A further includes fields such as "Busy signal request", "Busy signal transmit power", and "Busy signal duration". The format of the fields is illustrated only by way of example. The fields that constitute HE-SIG-A will be described below.

Busy signal request field has information about a request for transmission of a busy signal. Busy signal transmit power field has information about the transmission power of a busy signal. Busy signal duration field has information about the transmission duration of a busy signal.

HE short training field (HE-STF) is STF that can be decoded by an 802.11ax device. HE long training field (HE-LTF) is LTF that can be decoded by an 802.11ax device.

(2) Data (MAC)

Data (MAC) is a Field in which Data is Stored.

In an embodiment of the present disclosure, information about transmission of a busy signal is stored in HE-SIG-A field. However, the storage location is not limited, and the information may be stored in any given location. For example, information about transmission of a busy signal may be stored in a new header region extended after PHY Header and before Data or may be stored in an existing field for storing another information. For example, information about transmission of a busy signal may be stored at the head or the end, rather than in the middle of HE-SIG-A field. For example, the fields for storing information about transmission of a busy signal may be arranged in any order or is not necessarily arranged sequentially.

When a busy signal is not transmitted, the data frame need not provide a field for storing information about transmission of a busy signal. For example, the data frame may set the bits of all the fields for storing a busy signal to zero to indicate that no field is necessary because a busy signal is not to be transmitted. When a busy signal is transmitted, the data frame may set the bit of at least one of the fields for storing a busy signal to one.

2-3-2. Busy Signal

The busy signal is aimed to protect a process of receiving a data signal in a communication device. When receiving a data signal and the like, a communication device transmits a busy signal to another communication device to notify another communication device that the channel is in use. Another communication device receiving a busy signal can know that the channel is in use and does not transmit data and the like while a busy signal is being detected. For example, when receiving a data signal form the AP 100, the STA 200A can transmit a busy signal simultaneously with the reception process to protect the reception process of the data signal. For example, the AP 100 can transmit a busy signal after completing transmission of a data signal to the STA 200A to protect a reception process of ACK transmitted from the STA 200A.

When transmitting a busy signal to another communication device, a communication device may transmit a frame having a transmission-prohibited period (network allocation vector (NAV)) as a busy signal. Another communication device in the same system can read the information described in the frame and can set NAV. However, a communication device in another communication system is unable to read the information described in the frame and therefore unable to set NAV. A communication device in another communication system can detect a busy signal transmitted as a frame only for a moment and therefore is unable to set NAV by detecting the reception power of a busy signal.

Then, when a busy signal is to be detected also by a communication device in another communication system, the communication device describes no information in a frame and keeps transmitting a busy signal for a period of time in which it intends to prohibit the communication device in another communication system from transmitting. The communication device in another communication system can keep detecting the reception power of a busy signal and can set a period of time in which reception power is being detected as NAV.

The timing for transmitting a busy signal when the AP 100 receives ACK is not limited to immediately after transmission of a data signal, and a busy signal may be transmitted at any given timing. For example, when it can be determined that the time at which ACK is transmitted from the STA 200A is within a predetermined period of time (for example, SIFS time) after the AP 100 transmits a busy signal, the AP 100 may transmit a busy signal subsequently to completion of data transmission.

The AP 100 may start transmitting a busy signal at the timing when it receives ACK from the STA 200A. In doing so, the AP 100 may perform an address determination based on information described in ACK. However, if ACK is received in a period of time in which transmission of ACK is expected, it can be assumed that ACK has been transmitted to the AP 100. Therefore, the AP 100 does not have to perform an address determination based on information described in ACK. In this case, the AP 100 may perform an address determination based on reception power detected when receiving ACK. For example, if the reception power of ACK is larger than a predetermined threshold, the AP 100 may determine that ACK is addressed to the AP 100 itself. Here, a predetermined threshold is, for example, reception power when the AP 100 detects a preamble portion according to IEEE 802.11 standards.

When the AP 100 starts transmitting a busy signal without performing an address determination based on information described in ACK and finds that ACK is not addressed to the AP 100 itself during transmission, the AP 100 stops transmitting a busy signal. When it is found that ACK fails to be received normally, the AP 100 stops transmitting a busy signal as well.

The busy signal may have a preamble portion of a communication system according to IEEE 802.11 standards. In order for a communication device according to IEEE 802.11 standards to set NAV (transmission-prohibited period), the busy signal may have information about a duration in which the AP 100 transmits a data signal. In order for a communication device according to IEEE 802.11 standards to make a determination for aborting reception of a data signal, the busy signal may have BSS identification information.

The STA 200A sets a transmission duration of a busy signal, based on information about transmission of a busy signal described in the data signal transmitted by the AP 100. The STA 200A may continuously transmit a busy signal within the set transmission duration or may intermittently transmit a busy signal in accordance with the reception condition of the data signal.

2-3-3. ACK

Upon completing reception of a data signal from the AP 100 normally, the STA 200A transmits ACK to the AP 100. The timing when the STA 200A transmits ACK is not limited, and ACK may be transmitted at any given timing. For example, the STA 200A may transmit ACK every time reception of data is completed in units of sub-frames while reception of a data signal from the AP 100 is in progress.

When transmitting ACK, the STA 200A may transmit information indicating the reception condition of a data signal, such as signal to interference plus noise power ratio (SINR).

An example of the information communicated by the AP 100 and the STA 200 according to an embodiment of the present disclosure has been described above with reference to FIG. 6. An operation example of the communication system according to an embodiment of the present disclosure will now be described.

2-4. Operation Example

Figure 7:
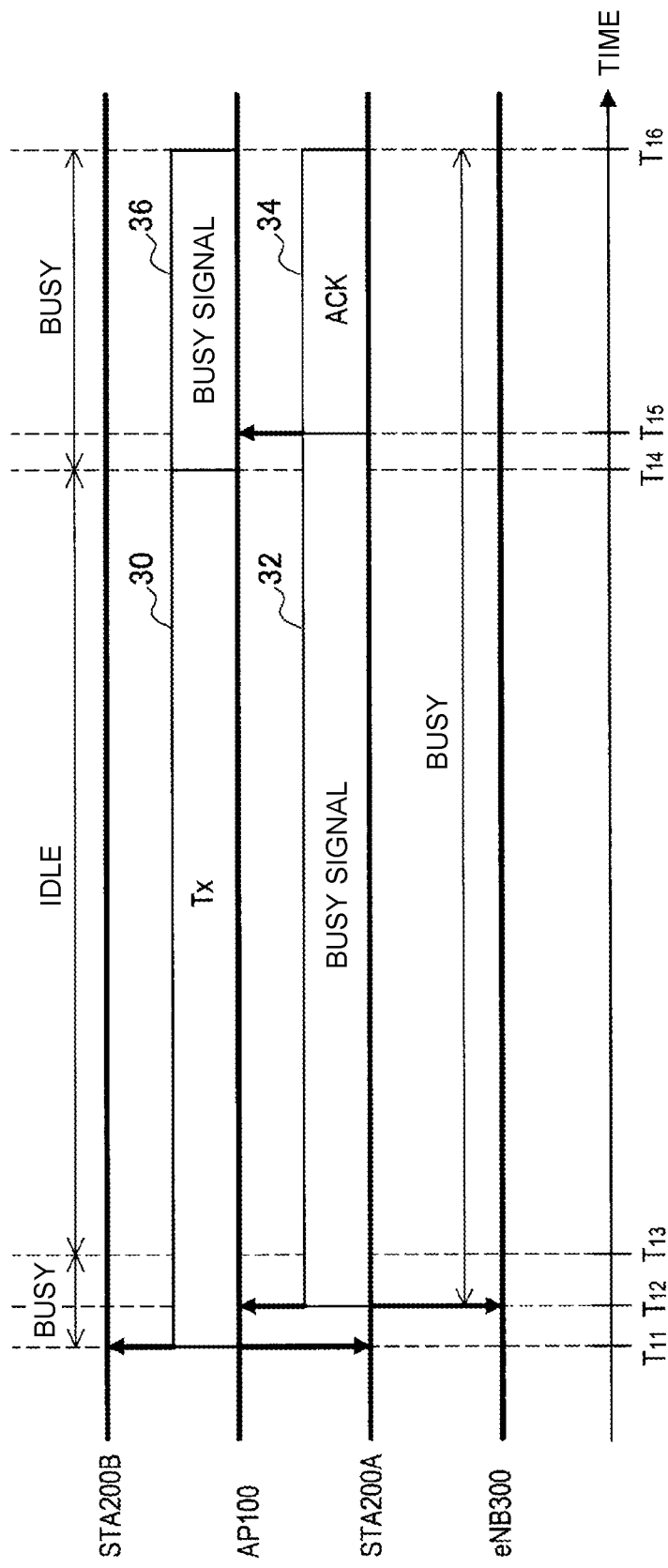
FIG. 7 is a sequence diagram illustrating an operation example of the communication system according to the embodiment.
Figure 8:
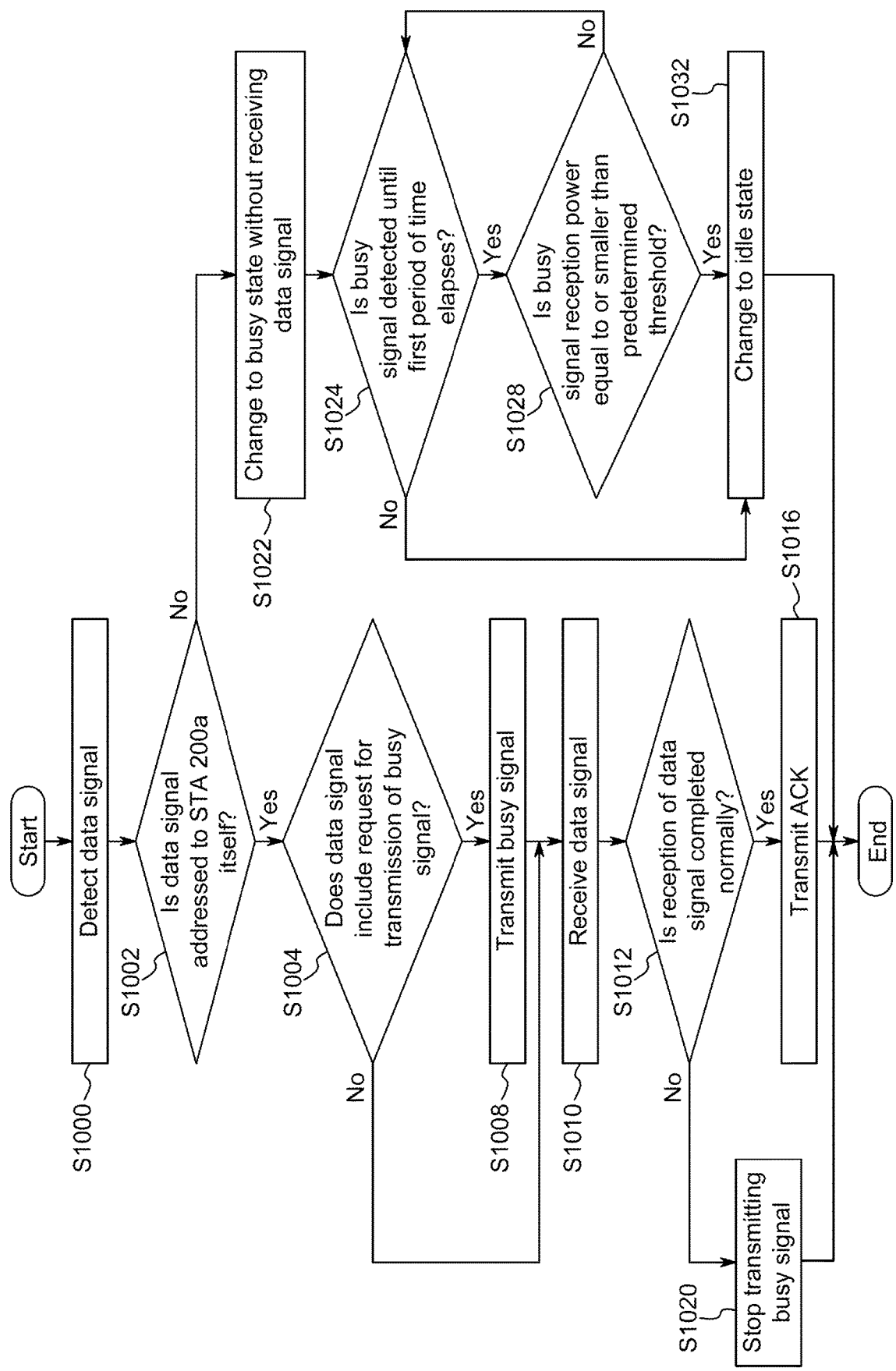
FIG. 8 is a flowchart illustrating an operation example of a communication device on the receiver side according to the embodiment.
Figure 9:
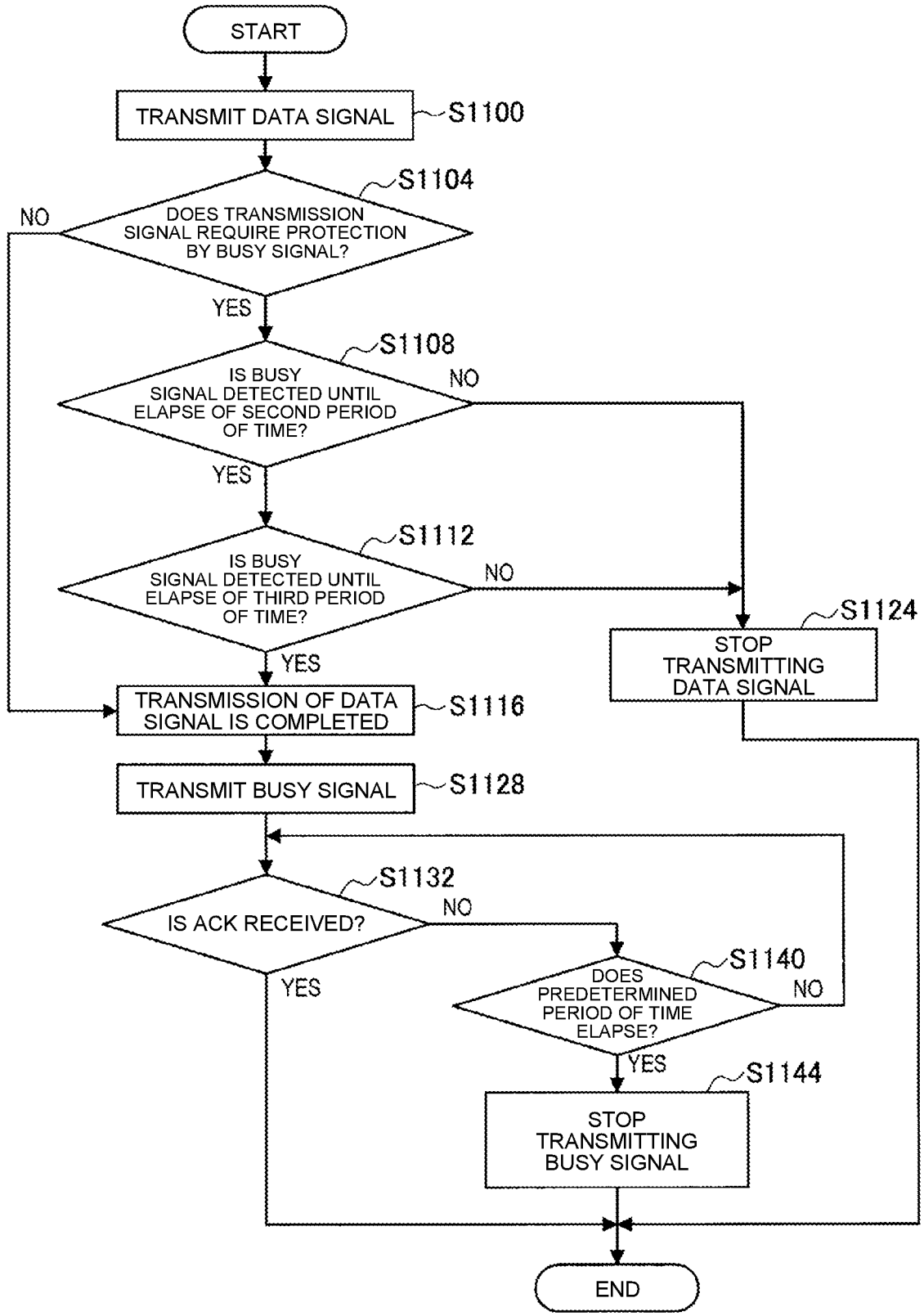
FIG. 9 is a flowchart illustrating an operation example of a communication device on the transmitter side according to the embodiment.

An operation example of the communication system according to an embodiment of the present disclosure is described. Referring to FIG. 7 to FIG. 9, an operation example of the communication system is described below.

(1) Operation Example of Communication System

Referring to FIG. 7, an operation example of the entire communication system according to an embodiment of the present disclosure is described. FIG. 7 is a sequence diagram illustrating an operation example of the communication system.

The sequence diagram in FIG. 7 illustrates an operation example of the AP 100, the STA 200A, the STA 200B, and the eNB 300 in a case where the AP 100 transmits data to the STA 200A. The horizontal axis in FIG. 7 indicates time, and the vertical arrows between communication devices indicate that a signal is transmitted to the communication device in the arrow direction.

First, the AP 100 transmits a data signal to the STA 200A as $T_x30$ (time $T_{11}$). The STA 200A receiving the data signal from the AP 100 confirms that the data signal is addressed to the STA 200A itself and includes a request for transmission of a busy signal, and transmits a busy signal 32 and starts receiving the data signal (time $T_{12}$). Although receiving the data signal from the AP 100, the STA 200B confirms that the data signal is not addressed to the STA 200B itself and then changes to a busy state (time $T_{11}$).

The AP 100 receiving the busy signal 32 from the STA 200A determines that the STA 200A is receiving the data signal normally and continues transmitting the data signal (time $T_{12}$). The eNB 300 detects the power of the busy signal 32 transmitted by the STA 200A and then changes to a busy state (time $T_{12}$). Since the busy signal 32 is not detected even when the SIFS time elapses, the STA 200B changes from a busy state to an idle state (time $T_{13}$).

Upon completing transmission of the data signal, the AP 100 transmits a busy signal 36 for receiving ACK 34 from the STA 200A and waits (time $T_{14}$). The STA 200B detects the busy signal 36 from the AP 100 and then changes from an idle state to a busy state (time $T_{14}$).

The STA 200A has completed reception of the data signal from the AP 100 normally and then transmits ACK 34 to the AP 100 (time $T_{15}$). At that moment, the eNB 300 detects the power of ACK 34 transmitted by the STA 200A and then continues a busy state (time $T_{15}$). After completing reception of ACK 34 from the STA 200A, the AP 100 stops transmitting the busy signal 36 (time $T_{16}$).

(2) Operation Example of Communication Device on Data Receiver Side

Referring now to FIG. 8, a specific determination process and operation in a communication device on the data receiver side will be described. In the following, for example, it is assumed that the communication device on the receiver side is the SAT 200A, and the communication device on the transmitter side is the AP 100.

First, upon detecting a data signal from the AP 100 (step S1000), the STA 200A confirms whether the data signal is addressed to the STA 200A itself (step S1002). If the data signal is addressed to the STA 200A itself (Yes at step S1002), the STA 200A confirms whether the data signal includes a request for transmission of a busy signal (step S1004). If the data signal includes a request for transmission of a busy signal (Yes at step S1004), the STA 200A transmits a busy signal (step S1008) and starts receiving the data signal (step S1010). If the data signal does not include a request for transmission of a busy signal (No at step S1004), the STA 200A starts receiving the data signal without transmitting a busy signal (step S1010).

If reception of the data signal is completed normally (Yes at step S1012), the STA 200A transmits ACK to the AP 100 (step S1016), and the process ends. If reception of the data signal is not completed normally (No at step S1012), STA 200A stops transmitting the busy signal (step S1020), and the process ends.

If the data signal is not addressed to the STA 200A itself (No at step S1002), the STA 200A changes to a busy state without receiving the data signal (step S1022). Subsequently, if a busy signal from another communication device is detected until a first period of time elapses since detection of the data signal (Yes at step S1024) and if the reception power of the busy signal is not equal to or smaller than a predetermined threshold (No at step S1028), the STA 200A continues a busy state. If a busy signal from another communication device is not detected until a first period of time elapses since detection of the data signal (No at step S1024), the STA 200A changes from a busy state to an idle state (step S1032). If the reception power of the detected busy signal is equal to or smaller than a predetermined threshold (Yes at step S1028), the STA 200A changes from a busy state to an idle state (step S1032).

(3) Operation Example of Communication Device on Data Transmitter Side

Referring now to FIG. 9, a specific determination process and operation in a communication device on the data transmitter side will be described. In the following, for example, it is assumed that the communication device on the transmitter side is the AP 100, and the communication device on the receiver side is the STA 200A, as with the description of FIG. 8. First, the AP 100 transmits a data signal to the STA 200A (step S1100). If the data signal does not require protection by a busy signal (No at step S1104), the AP 100 completes transmission of the data signal (step S1116).

If the data signal requires protection by a busy signal (Yes at step S1104), the AP 100 confirms whether a busy signal is detected until a second period of time elapses (step S1108). If a busy signal is detected (Yes at step S1108), it is confirmed whether a busy signal is detected after a third period of time elapses (step S1112). If a busy signal is detected (Yes at step S1112), the AP 100 completes transmission of the data signal (step S1116).

If a busy signal is not detected until a second period of time elapses since the data signal is transmitted (No at step S1108), the AP 100 determines that the STA 200A is not receiving the data signal normally and stops transmitting the data signal (step S1124). If a busy signal is detected until a second period of time elapses but a busy signal is not detected after a third period of time elapses (No at step S1112), the AP 100 stops transmitting the data signal, similarly (step S1124).

After completing transmission of the data signal, the AP 100 transmits a busy signal in order to receive ACK (step S1128). If ACK is received (Yes at step S1132), the AP 100 determines that the STA 200A has completed reception of the data signal normally, and the process ends. If ACK is not received (No at step S1132) but if a predetermined period of time does not elapse (No at step S1140), the AP 100 confirms reception of ACK until a predetermined period of time elapses. If a predetermined period of time elapses (Yes at step S1140), the AP 100 determines that the STA 200A is not receiving the data signal normally and stops transmitting the busy signal (step S1144).

An embodiment of the present disclosure has been described above with reference to FIGS. 1 to 9. Application examples of the technique according to an embodiment of the present disclosure will now be described.

3. Application Examples

The technique according to the present disclosure is applicable to a variety of products. For example, the STA 200 may be implemented as a mobile terminal such as a smartphone, a tablet personal computer (PC), a notebook PC, a portable gaming terminal, or a digital camera, a fixed terminal such as a television receiver, a printer, a digital scanner, or a network storage, or an in-vehicle terminal such as a car navigation device. The STA 200 may be implemented as a terminal that performs machine to machine (M2M) communication (which may be called a machine type communication (MTC) terminal), such as a smart meter, an automatic vending machine, a remote monitoring device, or a point of sale (POS) terminal. The STA 200 may be a wireless communication module (for example, an integrated circuit module on a single die) mounted on these terminals.

On the other hand, for example, the AP 100 may be implemented as a wireless LAN access point (which may be called a wireless base station) having a router function or not having a router function. The AP 100 may be implemented as a mobile wireless LAN router. The AP 100 may be a wireless communication module (for example, an integrated circuit module on a single die) mounted on these devices.

3-1. First Application

Figure 10:
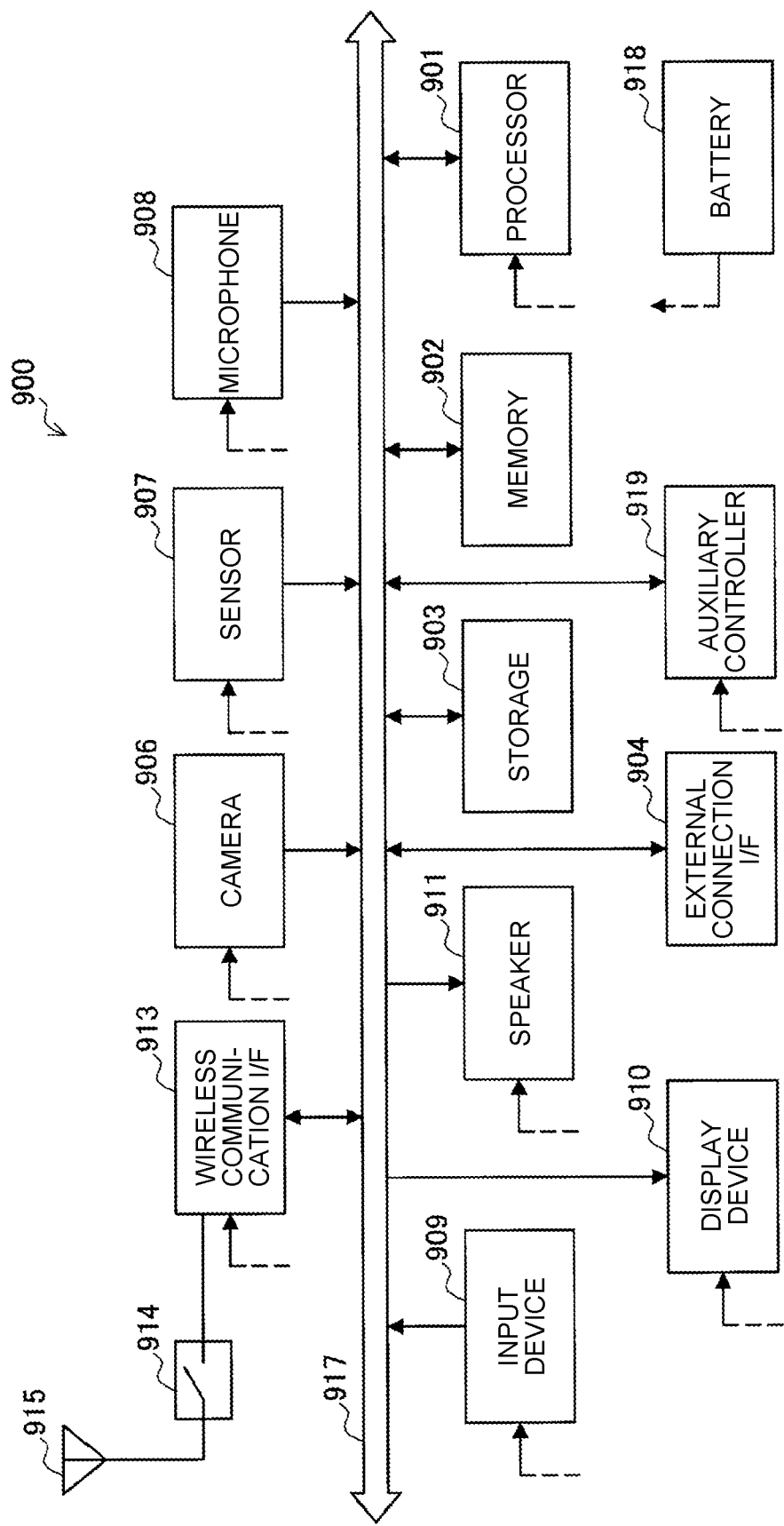
FIG. 10 is a block diagram illustrating an example of the overall configuration of a smartphone.

FIG. 10 is a block diagram illustrating an example of the overall configuration of a smartphone 900 to which the technique according to the present disclosure is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, a central processing unit (CPU) or a system-on-chip (SoC) and controls the functions of the application layer and other layers of the smartphone 900. The memory 902 includes a random access memory (RAM) and a read only memory (ROM) and stores a computer program executed by the processor 901 and data. The storage 903 may include a storage medium such as a semiconductor memory or a hard disk. The external connection interface 904 is an interface for connecting an external device such as a memory card or a universal serial bus (USB) device to the smartphone 900.

The camera 906 has, for example, an imaging device such as a charge-coupled device (CCD) or a complementary metal-oxide-semiconductor (CMOS) and generates a captured image. The sensor 907 may include, for example, sensors such as a positioning sensor, a gyro sensor, a geomagnetic sensor, and an acceleration sensor. The microphone 908 converts sound input to the smartphone 900 to an audio signal. The input device 909 includes, for example, a touch sensor for detecting touch on the screen of the display device 910, a keypad, a keyboard, a button, or a switch to accept operation or information input from the user. The display device 910 has a screen such as a liquid crystal display (LCD) or an organic light-emitting diode (OLED) display and displays an output image of the smartphone 900. The speaker 911 converts an audio signal output from the smartphone 900 to sound.

The wireless communication interface 913 supports one or more of wireless LAN standards such as IEEE 802.11a, 11b, 11g, 11n, 11ac, and 11ad and performs wireless communication. The wireless communication interface 913 can communicate with another device through a wireless LAN access point in the infrastructure mode. The wireless communication interface 913 can directly communicate with another device in the direct communication mode such as the ad hoc mode or Wi-Fi Direct (registered trademark). In Wi-Fi Direct, unlike the ad hoc mode, while one of two terminals operates as an access point, communication is directly performed between the terminals. The wireless communication interface 913 may typically include a baseband processor, a radio frequency (RF) circuit, and a power amplifier. The wireless communication interface 913 may be a one-chip module populated with a memory storing a communication control program, a processor for executing the program, and related circuits. The wireless communication interface 913 may support, in addition to wireless LAN schemes, other wireless communication schemes such as near-field wireless communication, close proximity wireless communication, or cellular communication. The antenna switch 914 switches the one connected by the antenna 915 among a plurality of circuits included in the wireless communication interface 913 (for example, circuits for different wireless communication schemes). The antenna 915 has a single or a plurality of antenna elements (for example, a plurality of antenna elements that constitute a MIMO antenna) and is used for transmission and reception of a wireless signal by the wireless communication interface 913.

The smartphone 900 is not limited to the example in FIG. 10 and may include a plurality of antennas (for example, an antenna for wireless LAN and an antenna for close proximity wireless communication). In this case, the antenna switch 914 may be eliminated from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 with each other. The battery 918 supplies electric power to each block of the smartphone 900 illustrated in FIG. 10 through a power supply line partially illustrated by a broken line in the drawing. The auxiliary controller 919 activates the minimum required functions of the smartphone 900, for example, in the sleep mode.

When the processor 901 executes the access point function on the application level, the smartphone 900 may operate as a wireless access point (software AP). The wireless communication interface 913 may have the wireless access point function.

3-2. Second Application

Figure 11:
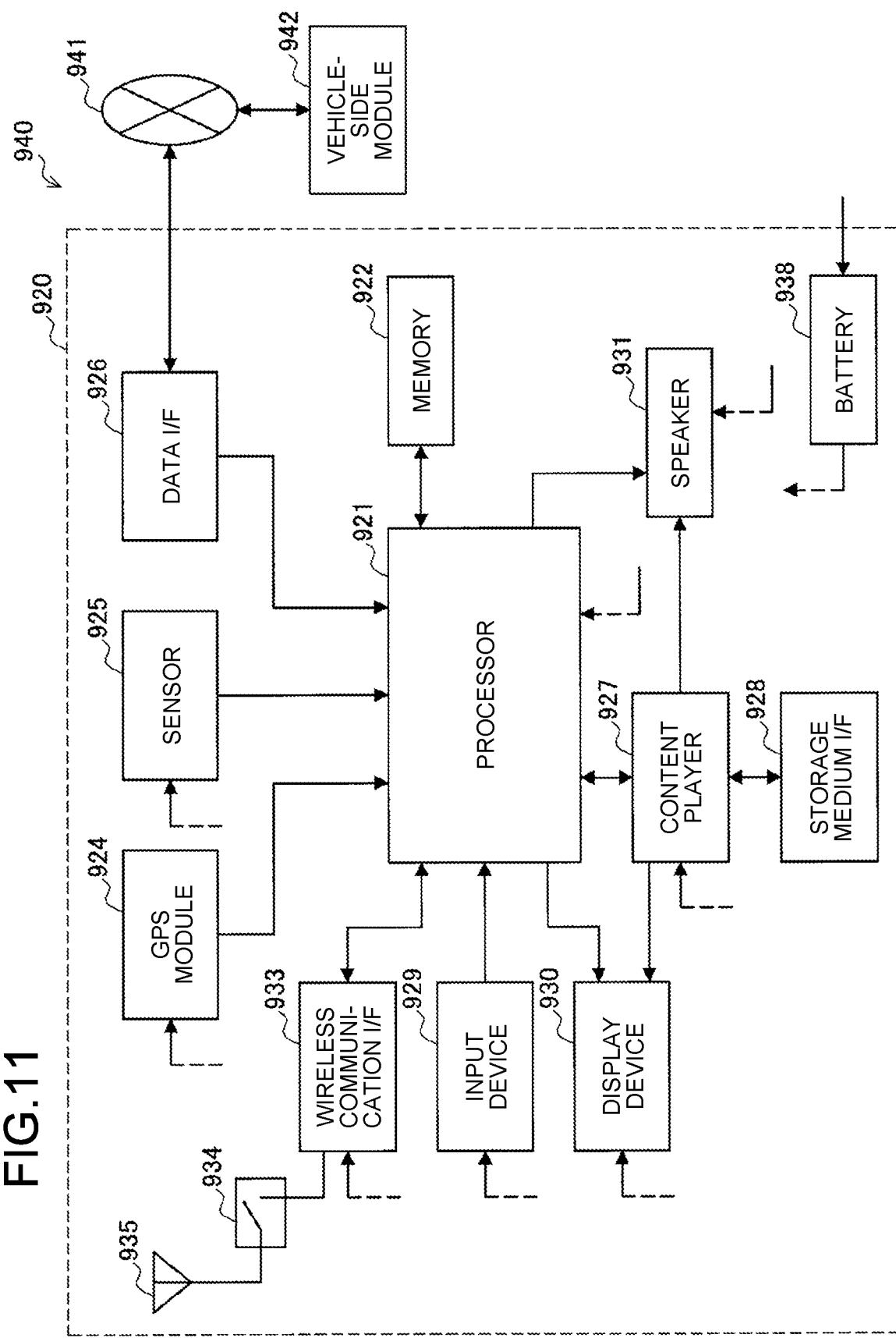
FIG. 11 is a block diagram illustrating an example of the overall configuration of a car navigation device.

FIG. 11 is a block diagram illustrating an example of the overall configuration of a car navigation device 920 to which the technique according to the present disclosure is applicable. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC and controls the navigation function and other functions of the car navigation device 920. The memory 922 includes a RAM and a ROM and stores a computer program executed by the processor 921 and data.

The GPS module 924 measures the position (for example, latitude, longitude, and altitude) of the car navigation device 920, using GPS signals received from GPS satellites. The sensor 925 may include, for example, sensors such as a gyro sensor, a geomagnetic sensor, and an atmospheric sensor. The data interface 926 is, for example, connected to an in-vehicle network 941 through a not-illustrated terminal and acquires data generated on the vehicle side, such as vehicle speed data.

The content player 927 replays a content stored in a storage medium (for example, CD or DVD) inserted in the storage medium interface 928. The input device 929 includes, for example, a touch sensor for detecting touch on the screen of the display device 930, a button, or a switch and accepts operation or information input from the user. The display device 930 has a screen such as an LCD or OLED display and displays an image of the navigation function or the replayed content. The speaker 931 outputs sound of the navigation function or the replayed content.

The wireless communication interface 933 supports one or more of wireless LAN standards such as IEEE 802.11a, 11b, 11g, 11n, 11ac, and 11ad and performs wireless communication. The wireless communication interface 933 can communicate with another device through a wireless LAN access point in the infrastructure mode. The wireless communication interface 933 can directly communicate with another device in the direct communication mode such as the ad hoc mode or Wi-Fi Direct. The wireless communication interface 933 may typically include a baseband processor, an RF circuit, and a power amplifier. The wireless communication interface 933 may be a one-chip module populated with a memory storing a communication control program, a processor for executing the program, and related circuits. The wireless communication interface 933 may support, in addition to wireless LAN schemes, other wireless communication schemes such as near-field wireless communication, close proximity wireless communication, or cellular communication. The antenna switch 934 switches the one connected by the antenna 935 among a plurality of circuits included in the wireless communication interface 933. The antenna 935 has a single or a plurality of antenna elements and is used for transmission and reception of a wireless signal by the wireless communication interface 933.

The car navigation device 920 is not limited to the example in FIG. 11 and may include a plurality of antennas. In this case, the antenna switch 934 may be eliminated from the configuration of the car navigation device 920.

The battery 938 supplies electric power to each block of the car navigation device 920 illustrated in FIG. 11 through a power supply line partially illustrated by a broken line in the drawing. The battery 938 also stores electric power supplied from the vehicle side.

The wireless communication interface 933 may operate as the AP 100 described above and may provide wireless communication to a terminal carried by the user on the vehicle.

The technique according to the present disclosure may be implemented as an in-vehicle system (or vehicle) 940 including one or more blocks of the car navigation device 920 described above, the in-vehicle network 941, and a vehicle-side module 942. The vehicle-side module 942 generates vehicle-side data such as vehicle speed, engine rotation speed, or failure information and outputs the generated data to the in-vehicle network 941.

3-3. Third Application

FIG. 12 is a block diagram illustrating an example of the overall configuration of a wireless access point 950 to which the technique according to the present disclosure is applicable. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and activates a variety of functions (for example, access restriction, routing, encryption, firewall, and log management) on the Internet Protocol (IP) layer and higher layers of the wireless access point 950.

The memory 952 includes a RAM and a ROM and stores a computer program executed by the controller 951 and a variety of control data (for example, terminal list, routing table, encryption key, security settings, and logs).

The input device 954 includes, for example, a button or a switch and accepts operation from the user. The display device 955 includes an LED lamp and displays the operation status of the wireless access point 950.

The network interface 957 is a wired communication interface for the wireless access point 950 to connect to a wired communication network 958. The network interface 957 may have a plurality of connection terminals. The wired communication network 958 may be a LAN such as Ethernet (registered trademark) or a wide area network (WAN).

The wireless communication interface 963 supports one or more of wireless LAN standards such as IEEE 802.11a, 11b, 11g, 11n, 11ac, and 11ad and serves as an access point to provide wireless connection to a nearby terminal. The wireless communication interface 963 may typically include a baseband processor, an RF circuit, and a power amplifier. The wireless communication interface 963 may be a one-chip module populated with a memory storing a communication control program, a processor for executing the program, and related circuits. The antenna switch 964 switches the one connected by the antenna 965 among a plurality of circuits included in the wireless communication interface 963. The antenna 965 has a single or a plurality of antenna elements and is used for transmission and reception of a wireless signal by the wireless communication interface 963.

4. Closing

According to the description above, the communication device according to the present disclosure can more efficiently avoid the hidden node problem. As described above, a new and improved communication device and a communication system that can more efficiently avoid the hidden node problem can be provided.

Although preferred embodiments of the present disclosure have been described in detail above with reference to the accompanying drawings, the scope of the present disclosure is not limited to such embodiments. It is obvious that one having ordinary knowledge in the technical field of the present disclosure would conceive a variety of changes and modifications without departing from the technical idea described in the claims, and it should be understood that these changes and modifications pertain to the technical scope of the present disclosure.

A series of processes by each device described in the present description may be implemented by any of software, hardware, and a combination of software and hardware. Computer programs that configure software are stored beforehand, for example, in a recording medium (non-transitory medium) provided inside or outside of the device. For example, each computer program is read by a RAM during execution by a computer and executed by a processor such as a CPU.

The processes described using the flowcharts and sequence diagrams in the present description are not necessarily executed in the illustrated order. Some process steps may be executed concurrently. An additional process step may be employed, and some of the process steps may be eliminated.

The effects described in the present description are merely explanatory and illustrative and are not intended to be limitative. The technique according to the present disclosure may achieve other effects apparent to those skilled in the art from the disclosure in the present description, in addition to or instead of the effects described above.

The following configuration may fall within the technical scope of the present disclosure.

(1)

A communication device comprising:

a communication unit configured to receive a data signal from another communication device;

a determination unit configured to determine whether the data signal received by the communication unit includes a request for transmission of a busy signal indicating that a channel is in use; and a control unit configured to control a process of transmitting the busy signal by the communication unit, in accordance with a determination result of the determination unit.

(2)

The communication device according to (1) above, wherein when the data signal includes the request for transmission of a busy signal, the control unit allows the communication unit to transmit the busy signal.

(3)

The communication device according to (2) above, wherein when the communication unit has completed reception of a part of the data signal normally, the control unit allows the communication unit to transmit ACK indicating that reception of a part of the data signal has been completed normally.

(4)

The communication device according to any one of (1) to (3) above, wherein the busy signal is continuously or intermittently transmitted during use of a channel.

(5)

The communication device according to any one of (1) to (4) above, wherein a transmission duration of the busy signal is determined based on information described in the data signal.

(6)

The communication device according to one of (1) or (2) above, wherein when the communication unit detects the data signal but does not receive the data signal and when the communication unit does not receive the busy signal within a first period of time since the data signal is detected, the control unit makes the communication device ready to transmit a signal from the communication unit to the other terminal.

(7)

The communication device according to one of (1) or (2) above, wherein when the communication unit detects the data signal but does not receive the data signal and when the communication unit receives the busy signal within a first period of time since the data signal is detected but the reception power of the busy signal is equal to or smaller than a predetermined value, the control unit makes the communication device ready to transmit a signal from the communication unit to the other terminal.

(8)

A communication device comprising:

a communication unit configured to transmit a data signal to another communication device;

a determination unit configured to determine whether the other terminal receiving the data signal transmitted by the communication unit is transmitting a busy signal indicating that the data signal is being received; and a control unit configured to control a process of transmitting the data signal to the other terminal, in accordance with a determination result of the determination unit.

(9)

The communication device according to (8) above, wherein when the communication unit receives the busy signal, the determination unit determines that the other communication device is receiving the data signal normally, and the control unit allows the communication unit to continue transmitting the data signal.

(10)

The communication device according to one of (8) or (9) above, wherein when the communication unit does not receive the busy signal until a second period of time elapses since the communication unit starts transmitting the data signal, the determination unit determines that the other communication device is not receiving the data signal normally, and the control unit allows the communication unit to stop transmitting the data signal.

(11)

The communication device according to any one of (8) to (10) above, wherein when the communication unit does not receive the busy signal after a third period of time elapses since the communication unit starts transmitting the data signal, the determination unit determines that the other communication device is not receiving the data signal normally, and the control unit allows the communication unit to stop transmitting the data signal.

(12)

The communication device according to any one of (8) to (11) above, wherein the control unit transmits the busy signal after transmission of the data signal is completed.

(13)

The communication device according to any one of (8) to (12) above, wherein when the data signal satisfies a predetermined condition, the control unit performs control such that the communication unit transmits the data signal that does not include the request for transmission of a busy signal.

(14)

The communication device according to any one of (1) to (13) above, wherein the communication device is a terminal adapted to full-duplex communication.

(15)

The communication device according to any one of (1) to (7) above, wherein the determination unit performs an address determination, based on information included in the data signal received by the communication unit, and the control unit controls a process of transmitting the busy signal by the communication unit, in accordance with a determination result of the address determination.

(16)

The communication device according to (15) above, wherein when the determination result indicating that the data signal is addressed to the communication device is acquired and when the data signal includes the request for transmission of a busy signal, the control unit allows the communication unit to transmit the busy signal.

(17)

A communication system comprising:

a data receiving device configured to determine whether a data signal received from another communication device includes a request for transmission of a busy signal indicating that a channel is in use, and to transmit the busy signal in accordance with a determination result; and a data transmitting device configured to transmit the data signal to the other terminal, depending on whether the other terminal receiving the data signal transmitted to another communication device is transmitting the busy signal.

REFERENCE SIGNS LIST

100 AP
110 communication unit
111 antenna
112 amplifier
114 wireless interface
116 signal processor
118 channel estimator
120 modem
130 data processing unit
140 control unit
142 determination unit
144 signal transmission controller
150 power supply unit
200 STA

The invention claimed is:

1. A first communication device comprising:
a transceiver; and
a processor configured to:
  detect a data signal from a second communication device;
  determine whether the data signal is addressed to the first communication device;
  upon determining that the data signal is addressed to the first communication device, determine whether the data signal includes a request for transmission of a first busy signal indicating that a channel is in use;
  upon determining that the data signal includes the request for the transmission of the first busy signal, continuously transmit the first busy signal while receiving the data signal from the second communication device via the channel;
  determine whether reception of the data signal is completed per a predetermined condition;
  upon determining that the reception of the data signal is completed per the predetermined condition, stop transmitting the first busy signal and transmit an acknowledgement to the second communication device; and
  upon determining that the reception of the data signal is not completed per the predetermined condition, stop transmitting the first busy signal without transmitting the acknowledgement to the second communication device.

2. The first communication device according to claim 1, wherein the processor is further configured to:
  upon determining that the data signal is not addressed to the first communication device, enter a busy state without receiving the data signal, the busy state being a state where transmissions via the channel are disabled;
  determine whether a second busy signal from the second communication device or a third communication device is detected within a predetermined period of time of entering the busy state;
  upon determining that the second busy signal is not detected within the predetermined period of time, enter an idle state where transmissions via the channel are enabled;
  upon determining that the second busy signal is detected within the predetermined period of time, determine whether a reception signal power of the second busy signal is equal to or smaller than a predetermined threshold;
  upon determining that the reception signal power of the second busy signal is equal to or smaller than the predetermined threshold, immediately enter the idle state; and
  upon determining that the reception signal power of the second busy signal is larger than the predetermined threshold, enter the idle state after the predetermined period of time expires.

3. A method performed by a first communication device, the method comprising:
  detecting a data signal from a second communication device;
  determining whether the data signal is addressed to the first communication device;
  upon determining that the data signal is addressed to the first communication device, determining whether the data signal includes a request for transmission of a first busy signal indicating that a channel is in use;
  upon determining that the data signal includes the request for the transmission of the first busy signal, continuously transmitting the first busy signal while receiving the data signal from the second communication device via the channel;
  determining whether reception of the data signal is completed per a predetermined condition;
  upon determining that the reception of the data signal is completed per the predetermined condition, stopping the transmitting the first busy signal and transmitting an acknowledgement to the second communication device; and
  upon determining that the reception of the data signal is not completed per the predetermined condition, stopping the transmitting the first busy signal without transmitting the acknowledgement to the second communication device.

4. The method according to claim 3, further comprising:
  upon determining that the data signal is not addressed to the first communication device, entering a busy state without receiving the data signal, the busy state being a state where transmissions via the channel are disabled;
  determining whether a second busy signal from the second communication device or a third communication device is detected within a predetermined period of time of entering the busy state;
  upon determining that the second busy signal is not detected within the predetermined period of time, entering an idle state where transmissions via the channel are enabled;
  upon determining that the second busy signal is detected within the predetermined period of time, determining whether a reception signal power of the second busy signal is equal to or smaller than a predetermined threshold;
  upon determining that the reception signal power of the second busy signal is equal to or smaller than the predetermined threshold, immediately entering the idle state; and
  upon determining that the reception signal power of the second busy signal is larger than the predetermined threshold, entering the idle state after the predetermined period of time expires.

\* \* \* \* \*